United States Patent [19]

Lanser et al.

[11] Patent Number: 5,067,764

[45] Date of Patent: Nov. 26, 1991

[54] VISOR WITH EXTENDABLE PANEL

[75] Inventors: Michael L. Lanser; Steven E. VanderVeen; David J. Becker, all of Holland, Mich.

[73] Assignee: Prince Corporation, Holland, Mich.

[21] Appl. No.: 604,680

[22] Filed: Oct. 26, 1990

[51] Int. Cl.⁵ ............................................. B60J 3/02
[52] U.S. Cl. .................................. 296/97.5; 296/97.8; 362/144
[58] Field of Search ........................... 296/97.8, 97.1; 160/DIG. 3

[56] References Cited

U.S. PATENT DOCUMENTS

| | | | |
|---|---|---|---|
| 2,228,209 | 1/1941 | Harrington | 296/97.8 |
| 2,733,763 | 2/1956 | Nygaard | 296/97.8 |
| 4,421,355 | 12/1983 | Marcus | 296/97.5 |
| 4,486,819 | 12/1984 | Marcus et al. | 296/97.1 X |
| 4,491,899 | 1/1985 | Fleming | 362/74 |
| 4,521,051 | 6/1985 | Cody et al. | 296/97.1 |
| 4,586,788 | 5/1986 | Hansen | 350/283 |
| 4,624,499 | 11/1986 | Flowerday | 296/97.1 |
| 4,639,085 | 1/1987 | Marcus et al. | 296/97.1 X |
| 4,648,011 | 3/1987 | Boote et al. | 296/97.1 X |
| 4,652,982 | 3/1987 | Flowerday | 296/97.1 X |
| 4,734,831 | 3/1988 | Keyser et al. | 362/74 |
| 4,760,503 | 7/1988 | VandenBerge et al. | 362/137 |
| 4,783,111 | 11/1988 | Hemmeke et al. | 296/97.8 |
| 4,807,093 | 2/1989 | Cisler | 296/97.5 |
| 4,824,159 | 4/1989 | Fluharty et al. | 296/37.7 |
| 4,922,391 | 5/1990 | Dykstra | 296/97.2 X |
| 4,925,232 | 5/1990 | Hemmeke et al. | 296/97.8 |

Primary Examiner—Robert R. Song
Attorney, Agent, or Firm—Price, Heneveld, Cooper, DeWitt & Litton

[57] ABSTRACT

An automotive visor includes a visor body with a slot for slidably receiving a panel which may include an illuminated vanity mirror. The panel is slidably mounted to the visor body and stabilizing structure assures that the panel moves smoothly between a stored position within the visor body and a use position extended from the visor body. In one embodiment the stabilizing structure includes cords which extend through the panel to opposite corners of the visor body. In another embodiment the stabilizing structure includes guide tracks and followers on the panel which are made of material to magnetically attract the followers to the tracks.

21 Claims, 3 Drawing Sheets

VISOR WITH EXTENDABLE PANEL

BACKGROUND OF THE INVENTION

The present invention relates to a visor and particularly to a visor with an extendable panel.

Vehicle visors with optional features such as vanity mirrors and lights have become popular in modern vehicles. Manufactures often seek to conceal or cover these features since they tend to detract from the overall aesthetically "clean" look of the interior passenger compartment of vehicles. Also, exposed mirrors are a potential safety hazard in the event of a vehicular crash. U.S. Pat. No. 4,486,819 discloses a visor including a slide-out panel and mechanism for controlling the panel. Also, commercial visors incorporating such a panel controlled by an axle with gears at opposite ends for engaging racks on opposite sides of the visor slot have been used for several years. Such mechanism, and other means for concealing and covering the functional features are often costly, complex, and difficult to assemble. Less expensive alternatives for covering or concealing such mirrors tend to bind, catch, and are often not reliable.

SUMMARY OF THE INVENTION

The present invention provides a unique stabilizing means for use with slidable panels housed within a visor. The stabilizing means provides a reliable mechanism which offers an improved stabilized sliding motion. The apparatus embodying the present invention includes a visor body with a slot therein which receives a slide out panel. The panel is slidable between a stored position within the visor body and a use position extending from the visor body. In one embodiment of the invention, the sliding panel is stabilized by a first cord anchored at diagonally opposing points along opposite sides of the slot and a second cord anchored at corresponding diagonally opposite points along opposing sides of the slot. Both cords include a portion which extends transversely between opposite sides through a channel or tunnel means fixedly secured to the sliding panel. The first and second cords slide in opposite directions through the channel means as the sliding panel is moved between the stored position and the extended use position such that the body is stabilized during movement.

In another embodiment, the stabilizing means employs a pair of magnets at opposite corners of the panel and ferro-magnetic tracks extending along sides of the slot to control the motion of the panel due to the magnetically attracted panel and tracks. In this embodiment, the magnets also hold the sliding panel in the visor body.

Such constructions are relatively inexpensive to manufacture, are durable, and provide smooth and easy operation. These and other features advantages and objects of the present invention will become apparent upon reading the following description thereof, together with the reference to the accompanying drawings in which:

DETAILED DESCRIPTION OF PREFERRED EMBODIMENTS

Figure 1:
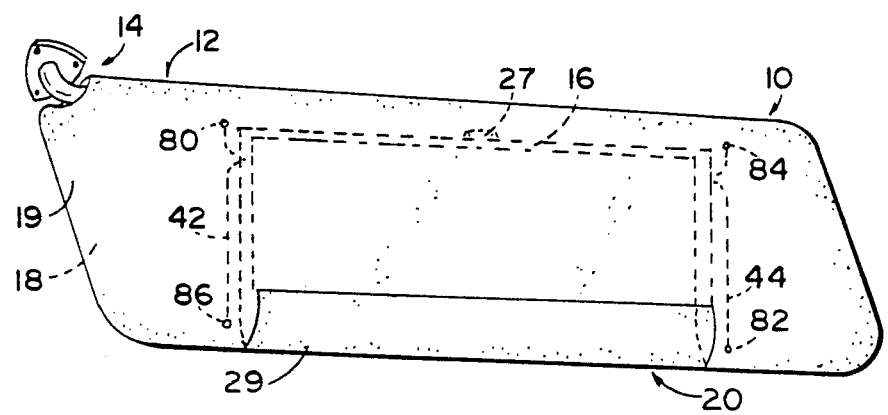
FIG. 1 is a perspective view of a visor embodying the present invention.
Figure 2:
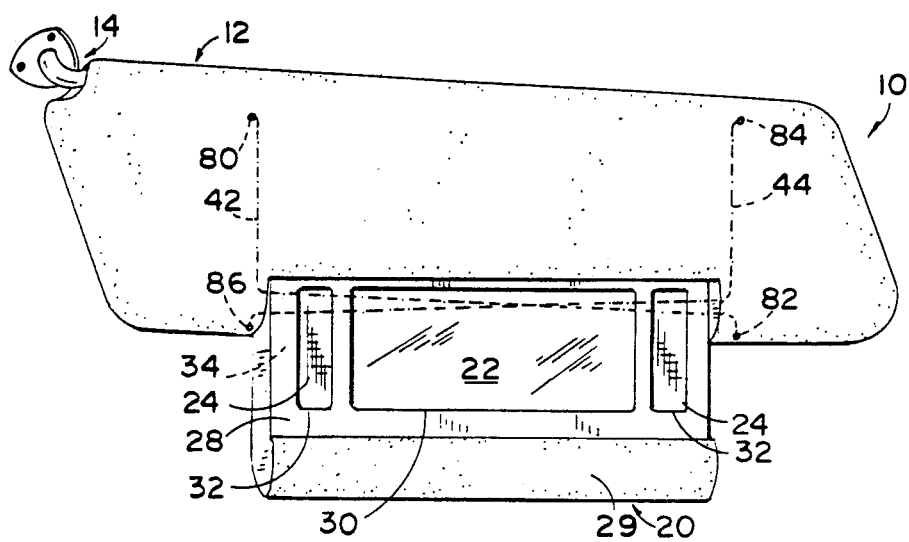
FIG. 2 is a perspective view of the structure shown in FIG. 1 with the sliding panel shown in an extended position.
Figure 6:
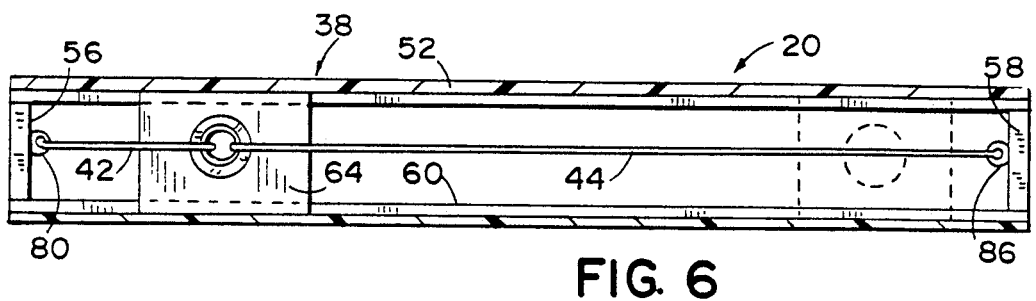
FIG. 6 is an enlarged left side elevational view of the panel shown in FIG. 2.
Figure 3:
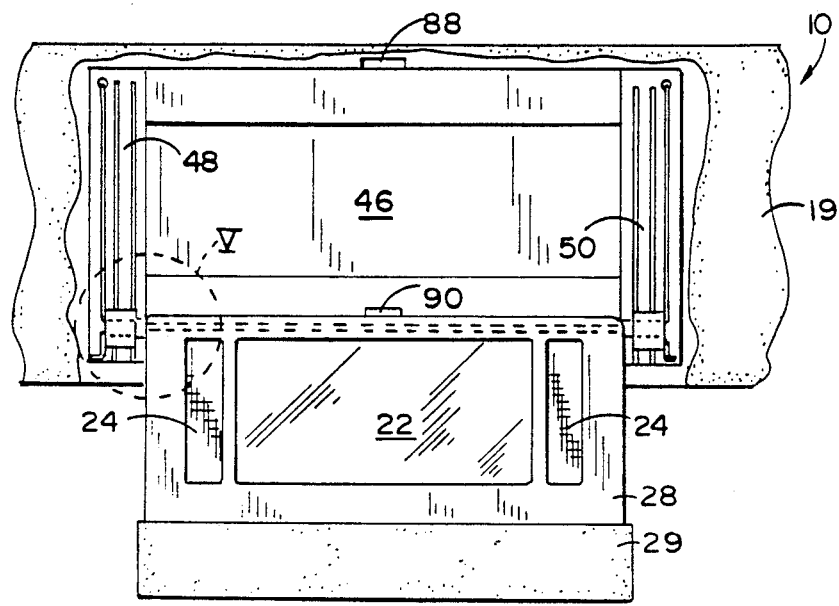
FIG. 3 is an enlarged, fragmentary, and partly broken-away front elevational view of the structure shown in FIG. 2.

Referring initially to FIGS. 1 and 2, there is illustrated a preferred embodiment of the invention comprising a visor assembly 10 which includes a visor body 12 having an internally molded polypropylene core 18 covered by a suitable upholstery material 19 to provide a finished appearance to the visor which matches the upholstery of the vehicle interior. An elbow bracket assembly 14 for mounting visor assembly 10 to a vehicle extends into core 18 along the upper edge of the visor and can be of the type described in U.S. Pat. No. 4,500,131 the disclosure of which is incorporated herein by reference. The visor core 18 includes a slot 16 along the lower edge of the visor body 12 so formed for receiving a sliding panel assembly 20. Slot 16 which provides recess mounting of the lower edge of assembly 20 also extends inwardly and upwardly through the core 18 to provide a recess receiving the assembly 20 when in a stored position as illustrated in FIG. 1.

Assembly 20 is a generally rectangular, planar, panel like structure which matably slides within slot 16. Assembly 20 includes a mirror 22 mounted on the front side which is bounded on a left side and right side by generally rectangular elongated lenses 24 behind which are provided a plurality of light sources for projecting illumination outwardly and convergently in front of mirror 22. A latch assembly 26 such as a magnetic catch selectively holds panel assembly 20 within visor body 12 in the fully inserted position and, upon exerting light downward force, panel 20 can be extended from visor body 12 to a lowered use position as illustrated in FIG. 2. Thus, illuminated mirror panel 20 retracts into visor body 12 for storage, as illustrated in FIG. 1, and extends from visor body 12 for use, as illustrated in FIG. 2. In its lowered use position, panel assembly 20 can also be pivoted forwardly or rearwardly to position the mirror 22 optimally for use.

Panel assembly 20 includes a front panel 28 having a lower handle portion 29 and a large rectangular aperture 30 for holding and exposing the reflecting surface of mirror 22. Mirror 22 is secured to the rear surface of panel 28 by conventional means such as by the use of integrally molded brackets into which mirror 22 fits. The face of panel 28 also includes two, elongated rectangular slots 32 extending vertically and in spaced relationship on opposing sides of mirror 22. Positioned behind rectangular slots 32 and secured by integrally molded brackets, are lenses or other light transmissive panels 24. Panel assembly 20 includes lamps, electrical conductors and suitable switch means for selectively providing light from lenses 24 as for example illustrated in U.S. Pat. No. 4,486,819; entitled VEHICLE VISOR LIGHTING APPARATUS in which light bulbs and an electrical circuit including sliding electrical contacts are shown. Reinforcing ribs are integrally molded in the polymeric panel assembly as required to stabilize front panel 28 from warpage or distortion. The panel assembly is guided and controlled in its motion into and out of visor recess 16 by a stabilizer assembly 36 and its interaction with associated parts as shown in one of the preferred embodiments which is illustrated in FIGS. 3-6.

Figure 5:
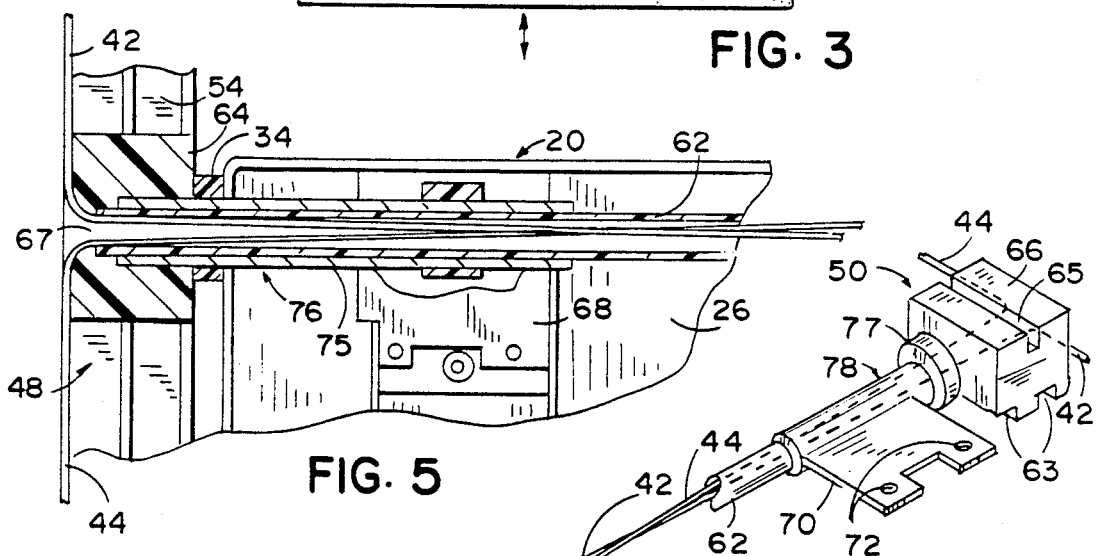
FIG. 5 is an enlarged fragmentary front elevational view partly in cross-section of the circled area V in FIG. 3.
Figure 4:
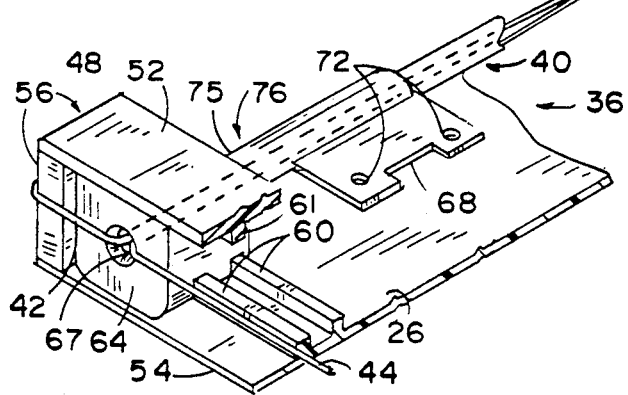
FIG. 4 is an enlarged fragmentary perspective view of a portion of the structure shown in FIG. 3.

Stabilizer assembly 36 is comprised of guide means including a pair of spaced parallel rails assemblies 48 and 50 mounted to the rear panel 46 of the visor core 18. Engaging the rail assemblies are guide blocks 64 and 66 which are coupled to the upper outer corners of panel assembly 20 by means of mounting members 76 and 78 as seen in FIGS. 4 and 5 to permit rotation of the panel with respect to the blocks 64 and 66. The stabilizer assembly 36 further includes stabilizing cords 42 and 44 which, as described in greater detail below, extend in opposite directions through a channel assembly 40 extending between mounting members 76 and 78 to control the motion of blocks 64 and 66 and the panel 20 coupled thereto.

The rail assemblies 48 and 50 are mounted to panel 46 which spaces them laterally a distance apart to a location parallel to and immediately adjacent opposing lateral sides of panel assembly 20. Each of the rail assemblies 48 and 50 comprises an upper and lower track 52 and 54, respectively, which are held together by end stanchion spacers 56 and 58 to space the upper and lower tracks adjacent opposite sides of guide blocks 64 and 66. Rails 52 and 54 comprise a lubricious polymeric material such as polypropylene which is formed to have multiple parallel lower spaced ridges 60 and an opposed upper ridge 61 centered between ridges 60 and facing the lower ridges. Blocks 64 and 66 each include mating grooves 63 and 65 into which the ridges 60 and 63 extend to provide a stable sliding interconnection between blocks 64 and 66 and the rail assemblies 48 and 50.

Channel assembly 40 extends laterally between the blocks 64 and 66 and the spaced rail assemblies 48 and 50 and is comprised of a cylindrical tube 62 which rotatably extends through cylindrical sleeves 75 and 77 integral with members 76 and 78 respectively, as best seen in FIG. 5. The opposite ends of tube 62 and the sleeves also extend into axially extending apertures 67 in guide blocks 64 and 66. Members 76 and 78 integrally include mounting flanges 68 and 70 respectively, with apertures 72 for fastening the mounting members to the inside of rear wall 42 of panel assembly 20. Front wall 30 of the panel assembly 20 also includes clearance openings 74 along reinforcing webs 34 which allow tube 62 to extend therethrough. The mounting members 76 and 78 serve to add strength to the ends of tube 62 and securely anchor, in a rotatable manner, the tube to the blocks 64 and 66 and panel assembly 20.

In the preferred embodiment shown, the system of stabilizing cords includes first and second stabilizing cords 42 and 44. First cord 42 has a first upper end 80 which is attached to and anchored at the center of spacer 56. Cord 42 is routed first downwardly along the outside of aperture 67 in block 64 and through the channel assembly 40. The cord exits through aperture 67, in block 66 and extends downwardly adjacent rail assembly 50 to a second attachment point 82 located on the lower right spacer 58 associated with rail assembly 50. Similarly, the second stabilizing cord 44 has one end 84 attached to the corresponding upper spacer 56 of rail assembly 50, is threaded horizontally through channel assembly 40, and routed downwardly to a corresponding attachment point 86 at the lower spacer 58 of rail assembly 48. The routing and anchoring of first cord 42 and second cord 44 of the preferred embodiment are best shown in FIGS. 1 and 2 in phantom lines, though it is contemplated that the anchoring of cords 42 and 44 could be anywhere which would permit the sliding motion as described.

Latch assembly 27 is mounted along the upper edge of slot 16 and upper edge of panel assembly 20. Latch assembly 27 includes a magnetic member 88 (FIG. 3) and a magnetically responsive member 90, one of which is mounted to the top edge of panel assembly 20 and the other of which is correspondingly mounted to the upper edge of slot 16 within visor body 12. As assembly 20 is pulled toward an extended position, members 88 and 90 release in a smooth manner thus allowing assembly 20 to extend from visor body 12. As assembly 20 is reinserted into visor body 12, members 88 and 90 reattach in a positive manner without additional effort and again in a smooth and satisfying manner.

Having described the components and arrangement of the visor assembly 10 embodying the present invention, the operation of this device should become clear to a person skilled in the art. Briefly, panel assembly 20 is assembled and fully inserted within visor body 12 forming visor assembly 10, visor assembly 10 being installed within a vehicle as is commonly known in the art. As an operator desires to utilize assembly 20, the operator grips handle 29 pulling downwardly such that members 88 and 90 of latch assembly 26 release allowing assembly 20 to move downwardly. Channel assembly 40 is securely fastened to panel assembly 20 such that as panel assembly 20 slides downwardly, panel assembly 20 is forced to follow spaced rails 48, 50 by blocks 64 and 66. As assembly 20 moves downwardly, first cord 42 and second cord 44 slide opposingly through tube 62 and outwardly through blocks 64 and 66 such that assembly 20 is stabilized as it moves downwardly. The stabilizing process prevents assembly 20 from cocking or tilting, and also provides a smooth and pleasing "feel" as assembly 20 is moved. The opposing motion of cords 42 and 44 as they pass tube 62 and outwardly past blocks 64 and 66 and as the blocks slide along spaced rails 48 and 50 provide a constant uniform frictional force to provide a smooth and controlled downward or upward movement. At the fully extended position, blocks 64 and 66 engage spacers 58 in the lower end of rail assemblies 48 and 50 providing a positive lower stop. In the fully extended position, front panel 28 of panel assembly 20 is fully exposed, exposing optional components such as mirror 22 and/or lights.

When an operator is through using the options installed on assembly 20, the operator merely reverses the above procedure pushing assembly 20 upwardly into visor body 12. The motion of cords 42 and 44 within channel assembly 40 are reversed, thus providing a stabilizing force and uniform frictional force as assembly 20 has moved upwardly into slot 16 of visor body 12. As assembly 20 reaches the fully inserted position, members 88 and 90 of latch assembly 27 reattach to hold the panel assembly 20 in a secure fully inserted storage position.

Figure 7:
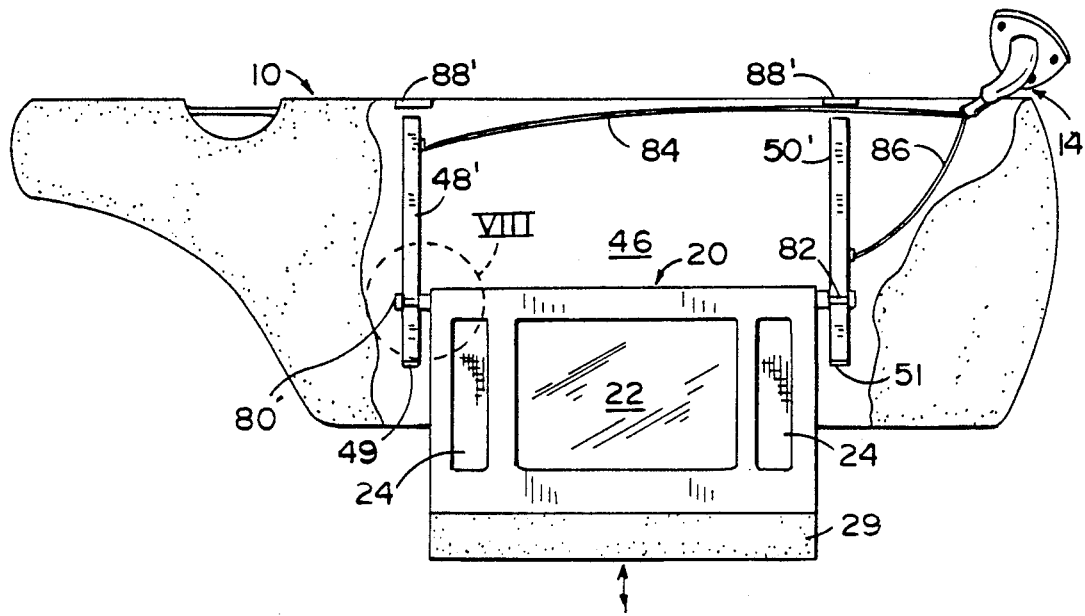
FIG. 7 is an enlarged, fragmentary, and partly broken-away front elevational view of an alternative embodiment of the invention.
Figure 8:
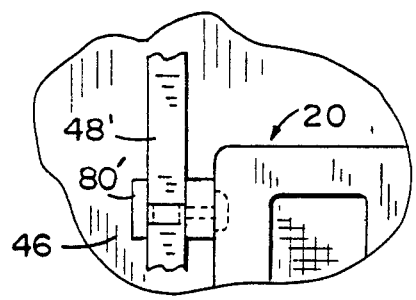
FIG. 8 is an enlarged fragmentary front elevational view, partly in cross-section of the circled area VIII in FIG. 7.

In another embodiment of the present invention stabilizing means 36 of the first embodiment is replaced with the stabilizing means shown in FIGS. 7 and 8. As shown in FIG. 7, elements common to the first embodiment are identified with the same reference numerals, the guide members 48 and 50 of the first embodiment are replaced with metal ferro- magnetic strips 48' and 50' which are mounted to the rear wall 46 of the visor core and include outwardly bent lower edges 49 and 51 respectively which serve as lower stops during operation of the unit. Along the upper edge of panel assembly 20 and extending outwardly from upper corners thereof are as best seen in FIG. 8 are a pair of followers comprising magnets 80' and 82 which are aligned and positioned over strips 48' and 50' respectively. At the upper edge of the visor core there are mounted in spaced relationship to strips 48' and 50', metal latch members 88' which when the panel assembly is fully inserted into the visor body in the same manner as previously described above, engage magnets 80' and 82 for releasably holding the panel assembly 20 in the visor body. As the panel is pulled outwardly for use, the magnets 80' and 82 provide an attracting force with respect to the ferro- magnetic stamped strips or tracks 48' and 50' thereby providing a magnetic drag as the panel is drawn downwardly from the stored position.

When the panel is in its fully extended position against stops 49 and 51, the magnetic attraction between magnets 80' and 82 and the metal tracks 48' and 50' respectively provides a rotational torque allowing the panel to be tilted as desired and held in a tilted position by the magnetic attraction between the magnets and the L-shaped ends of the tracks 48' and 50'. For such purpose, the follower magnets preferrably have a cylindrical outer surface to allow rotation of the panel assembly. In a preferred embodiment, the magnets 80' and 82 were generally spool-shaped with ends which spanned the tracks 48' and 50' to provide further stability to the movement of the panel assembly 20. In other embodiments the guide tracks can be of a magnetic material while the followers be made of a ferro-magnetic material.

Further, the use of electrically conductive magnets 80' and 82 provides a current path for the electrical supply of power for lights 24 carried in the illuminated vanity mirror panel assembly 20 as described above. Thus, a first conductor 84 is coupled to track 48' and a second conductor 86 is coupled to conductive track 50'. These conductors then extend through the hollow pivot rod assembly 14 to the vehicle's electrical supply system in a conventional manner. Thus by the utilization of the magnets 80' and 82 and associated conductive ferro- magnetic strips 48' and 50', both a visor control for guiding and controlling the motion of the illuminated vanity mirror package assembly 20 and for providing operating power thereto is provided.

It will become apparent to those skilled in the art that various modifications to the preferred embodiments of the invention disclosed herein, can be made without departing from the spirit and scope of the invention as defined by the appended claims.

The embodiments of the invention in which an exclusive property or privilege is claimed are defined as follows:

1. An vehicle visor comprising:

a visor body including slot means formed along a lower edge thereof and extending within said visor body for receiving a slide-out panel, said slot means defining opposing sides therein;

means for mounting said visor body to a vehicle for movement between a raised stored position and a lowered use position;

a panel shaped to fit within said slot means of said visor body;

means for slideably mounting said panel to said visor body for movement between a stored position within said visor body and a use position extended from said visor body; and means for stabilizing said panel within said visor including a channel means mounted to said panel means and extending toward said opposing sides of said slot, and a first and a second cord; wherein said first cord is anchored at diagonally opposing points along said opposing sides of said slot and extending transversely between said opposite sides through said channel member; and wherein said second cord is anchored at corresponding diagonally opposite points along said opposing sides of said slot and extending transversely between said opposite sides through said channel member; whereby said first and second cords slide in opposite directions through said channel means as said panel is moved between said stored position and said extended use position to stabilize the sliding movement of said panel.

2. The apparatus as defined in claim 1 and further including latch means mounted to said panel and said visor body for releasably holding said panel in said stored position.

3. The apparatus as defined in claim 2 wherein said latch means includes a magnetically responsive member and further includes a magnet, said magnetically responsive member and said magnet operably mounted on said panel and said visor body to latch when said panel is in said stored position thereby securely holding said panel in said stored position.

4. The apparatus as defined in claim 1 wherein said channel means is an elongated tube.

5. The apparatus as defined in claim 4 wherein said tube is plastic.

6. The apparatus as defined in claim 1 wherein said first and second cords are made of a flexible strand of material having a low coefficient of friction with respect to said channel means.

7. The apparatus as defined in claim 1 wherein said means for slideably mounting said panel includes guide means.

8. The apparatus as defined in claim 1 wherein said panel includes a mirror.

9. The apparatus as defined in claim 1 wherein said panel includes an illuminating means for directing illumination outwardly from said mirror for use of said mirror under low ambient light conditions.

10. An vehicle visor comprising:

a visor body including slot means formed along a lower edge thereof and extending in said body for receiving a slide-out panel;

a panel shaped to fit within said slot means of said visor body;

means for mounting said panel within said visor body to allow said panel to move between a stored position within said slot means and a use position extended from said slot means, said mounting means comprising a pair of spaced parallel guide tracks mounted to said visor body within said slot means, and stabilizing means extending between said panel and said guide tracks, wherein said stabilizing means comprises a pair of cords extending through said panel and wherein each of said cords are anchored to said visor body adjacent opposite corners of said slot.

11. The apparatus as defined in claim 10 and further including latch means mounted to said panel and said visor body for releasably holding said panel in said stored position.

12. The apparatus as defined in claim 11 wherein said latch means includes a magnetically responsive member and a magnet, wherein one of said magnetically responsive member and said magnet is mounted on said panel and the other of said magnetically responsive member and said magnet is mounted to said visor body to latch said panel in said stored position when said panel is moved toward said stored position.

13. The apparatus as defined in claim 10 wherein said panel includes channel means and wherein said cords extend through said channel means.

14. The apparatus as defined in claim 13 wherein said channel means comprises a tube.

15. The apparatus as defined in claim 10 wherein said first and second cords are made of a flexible strand of material having a low coefficient of friction.

16. The apparatus as defined in claim 10 wherein said means for mounting said panel comprises means for mounting said panel for sliding motion between said stored and use positions.

17. The apparatus as defined in claim 10 wherein said panel includes a mirror.

18. A vehicle visor comprising:
a visor body including slot means formed along an edge thereof and extending in said body for receiving a slide-out panel therein
a panel shaped to fit within said slot of said visor body;
means for slidably mounting said panel within said slot of said visor body, said mounting means including a pair of guide tracks positioned in said visor body and extending in parallel spaced relationship to one another, said guide tracks being substantially smooth for slidably receiving follower means, said mounting means further including follower means mounted to said panel; and
string means coupled between said panel and opposite sides of said visor body for stabilizing the motion of said panel between a stored position within said visor body and a use position extended from said visor body.

19. The apparatus as defined in claim 18 wherein said string means includes a pair of spaced cords extending between opposite corners of said slot in said visor body and through said mounting means for said panel to stabilize the motion of said panel.

20. The apparatus as defined in claim 18 wherein said panel includes a vanity mirror and means for illuminating said vanity mirror for use under low ambient light conditions.

21. The apparatus as defined in claim 20 wherein said tracks and said followers are made of an electrically conductive material and further including conductor means coupled to said tracks to supply electrical operating power to said followers for application to said illumination means of said panel.

* * * * *

UNITED STATES PATENT AND TRADEMARK OFFICE
CERTIFICATE OF CORRECTION

PATENT NO. : 5,067,764
DATED : November 26, 1991
INVENTOR(S) : Michael L. Lanser et al.

It is certified that error appears in the above-identified patent and that said Letters Patent is hereby corrected as shown below:

Column 1, line 9:
   "Manufactures" should be --Manufacturers--;

Column 3, line 17:
   "rails" should be --rail--;

Column 3, line 65:
   After "first" insert --or--;

Column 3, line 68:
   After "outside of" insert --rail assembly 48 and then laterally sidewardly through--;

Column 5, line 68:
   "An" should be --A--;

Column 6, line 59:
   "An" should be --A--.

Signed and Sealed this

Twenty-ninth Day of June, 1993

Attest:

MICHAEL K. KIRK

*Attesting Officer*    *Acting Commissioner of Patents and Trademarks*